May 8, 1928.  1,668,691

P. G. MIDGETT

ANIMAL TRAP

Filed July 2, 1925    2 Sheets-Sheet 1

Penetton G. Midgett
INVENTOR.

BY  G.C. Waldrop.
ATTORNEY.

May 8, 1928.

P. G. MIDGETT

ANIMAL TRAP

Filed July 2, 1925

Penetton G. Midgett
INVENTOR.

BY J.C. Waldrop

ATTORNEY.

Patented May 8, 1928.

1,668,691

UNITED STATES PATENT OFFICE.

PENELTON G. MIDGETT, OF DALLAS, TEXAS, ASSIGNOR OF ONE-HALF TO ARTHUR C. SCOTT, OF DALLAS, TEXAS.

ANIMAL TRAP.

Application filed July 2, 1925. Serial No. 41,099.

This invention relates to animal traps and it has particular reference to that type of trap adapted to ensnare and imprison without injury, wild animals, game, rats, mice and other depredating rodents, the primary object being to provide a trap having sufficient capacity to house a considerable number of the animals without injury to the latter, which may tend to prevent others from entering the trap.

The invention further contemplates a trap of practical and durable construction having entrances at opposite ends thereof which are so arranged as to function with the slightest pressure, as in the case of traps constructed exclusively for the purpose of ensnaring smaller rodents such as rats and mice.

Still further, the invention provides a trap having compartments, adapted to house live bait such as birds or other fowl, from which compartments the animals entering the trap are excluded, and which have proper expediencies for feeding and sustaining the decoys while within the compartments.

With the above and other objects and advantages in view, the invention has particular reference to certain novel features of construction and operation of parts, by which the foregoing and other objects are attained, as set forth in the following detail description and illustrated in the accompanying drawings in which.

Proceeding in accordance with the foregoing, 1 denotes a lower screened section having alined passageways 2 having their entrances 3 at opposite ends of the trap. An intermediate compartment 4 is provided for suitable bait, said compartments having doors 5, and being so constructed that the interior thereof may be in view. See Figure 4.

Figure 4:
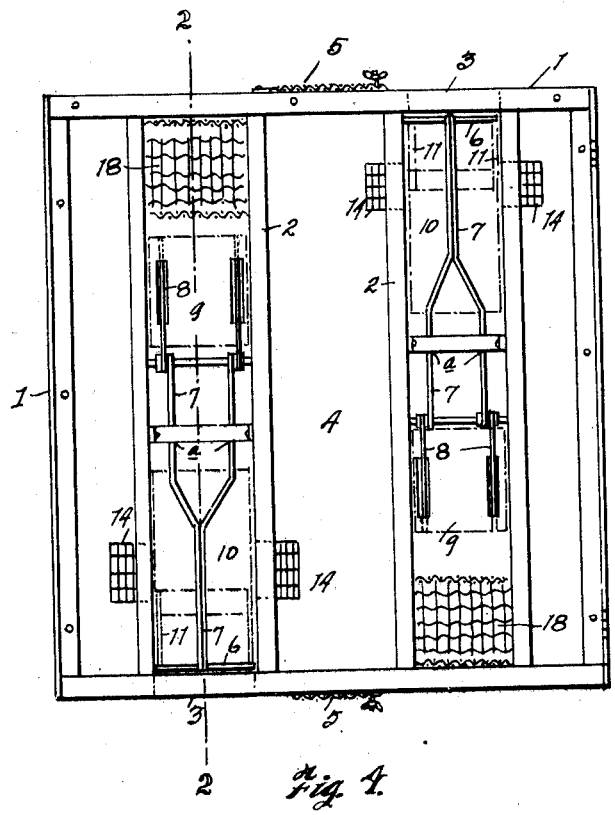
Figure 4 is a plan view of the trap showing the passageways, treadles and bait compartments therein.

As shown in Figure 4, each passageway 2 is constructed in the same manner and therefore a description of one of them will be sufficient.

Figure 2:
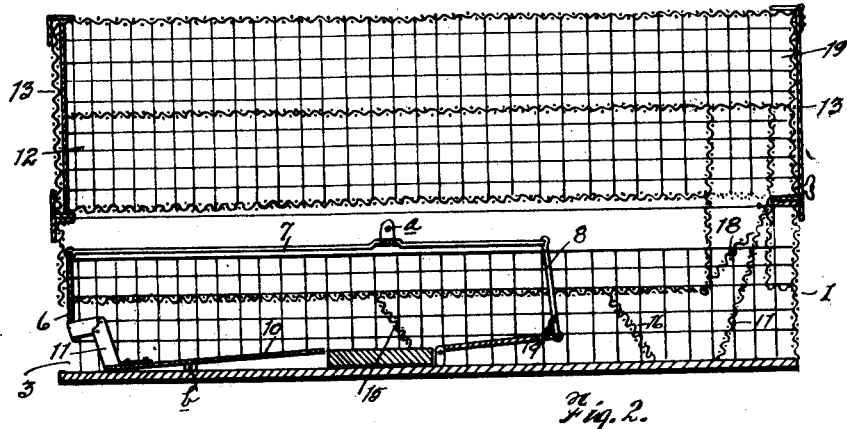
Figure 2 is a longitudinal sectional elevation of one of the entrapping passageways, taken on lines 2—2 of Figure 4.
Figure 3:
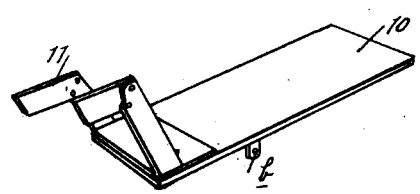
Figure 3 is a detail of one of the treadles by which the trap door is operated.

It will be observed in Figure 2 that each of the entrances 3 has a trap door 6, suspended thereover by a pair of rods 7, which are pivoted intermediate their ends at $a$.

To the inner ends of these rods are secured the upper ends of links 8 which have their opposite ends pivoted to the inner ends of a treadle 9, which is pivoted at its opposite end to the floor of the passageway. A similar treadle 10 is disposed adjacent the entrance, pivoted intermediate its ends at $b$ to the floor of the passageway and having arms 11 extending upwardly to engage the bottom of the door 6, which is held in suspension thereby.

Figure 1:
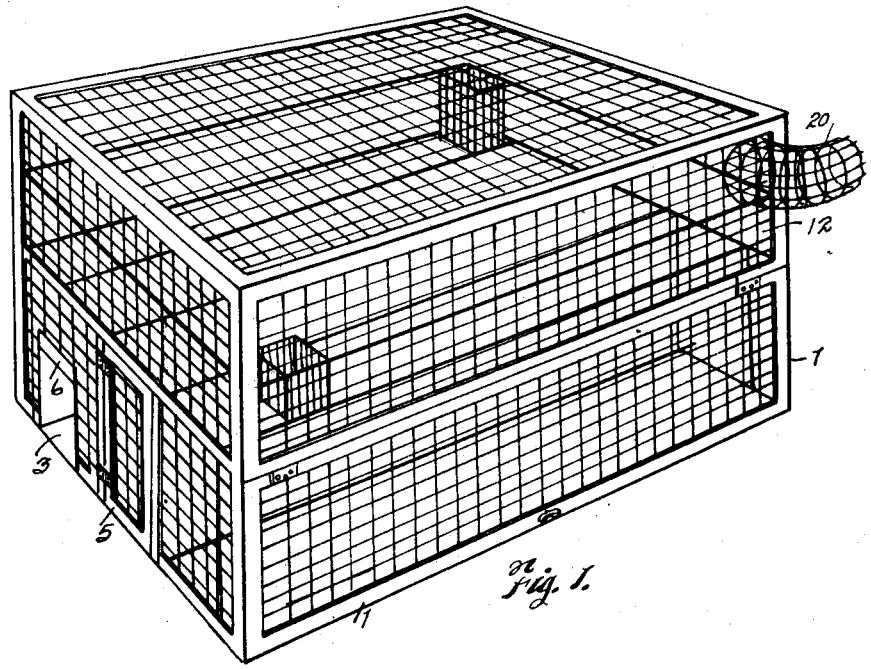
Figure 1 represents a perspective view of the trap.

It will be also observed that the trap is composed of superimposed sections or compartments, suitably divided, to exclude the imprisoned animals from the live decoys, which may be maintained in the compartment 12, shown in Figure 2, which is provided at either end with doors 13, for the purpose of installing and feeding the decoys. Within the intermediate compartment 4, shown in Figure 1, suitable decoys are also placed and likewise excluded from the passageways. Certain other bait, known to be relished by the animals, may be placed in the mesh containers 14 as a further decoy.

In operation, the animal for which the trap is intended, enters at one of the openings 3, over which is suspended the door 6, and causes the treadle 10 and arms 11 to operate, thus releasing the door 6 from its suspended position, as illustrated in Figure 2. Continuing, the imprisoned animal passes the swinging door 15 and his weight on the treadle 9 actuates the rods 7, which elevate the door 6, at which time the arms 11 resume their position therebeneath and again hold the door in suspended position.

The animal then passes a second swinging door 16, and continues upward along the stair 17, passing the trap fall 18 and entering the compartment 19, above the compartment 12 maintained for the decoys.

The same operation takes place in both passageways which are disposed oppositely, in order to afford an opening at either end of the trap.

After imprisonment within the trap, the animals are herded through a suitable outlet 20 into a convenient receptacle in which they may be asphyxiated, electrocuted, or otherwise humanely disposed of.

The preferred form of the invention has been disclosed in the drawings. However, should it be desired, the trap fall 18 may be dispensed with as well as the oppositely disposed entrances which may be made on one side of the trap thus permitting a runaround to be constructed across the entire end of the trap, which would afford capacity for a greater number of animals.

The invention, as disclosed, shows only two complete sections but the trap may be constructed to include any number desired, and other minor changes and modifications may be resorted to which fall within the meaning and scope of what is herein claimed.

What is claimed is:—

1. In an animal trap having superposed sections, a lower section including oppositely disposed parallel aligned passageways, a door suspended over the entrance to each passageway, means for releasing and elevating said door, longitudinally aligned treadles adjacent the entrance to each of said passageways each of said treadles being operable by the weight of an animal thereupon and adapted respectively to operate said means for releasing and elevating said door, means after each of said treadles to prevent the animals from returning to the entrance, a screened compartment between said passageways provided with a door for the introduction of decoys and bait, a second and third section coextensive with said lower section one being provided for live decoys and the other for housing the trapped animals, means in said sections whereby animals may be placed in the sections or removed therefrom, means by which the animals may ascend from the lower section, and means for preventing the animals from returning to the lower section.

2. In an animal trap having superposed screened sections, a lower section including parallel aligned passageways extending the entire length of the trap, bait compartments adjacent the entrance to each passageway, a door suspended over the entrance to each passageway, means for releasing and elevating said door, longitudinally aligned treadles on a single plane adjacent the entrance to each of said passageways each of said treadles being operable by the weight of an animal thereupon and adapted respectively to operate said means for releasing and elevating said door, a swinging door after each of said treadles, a screened compartment between said passageways provided with a door for the introduction of decoys and bait, a second and third section above said lower section one being provided for live decoys and the other for housing the trapped animals, means in said sections whereby animals may be placed in the sections or removed therefrom, a screened stair by means of which the animals may ascend from the lower section, and a trap fall for preventing them from returning to the passageway.

In testimony whereof I affix my signature.

PENELTON G. MIDGETT.